United States Patent

Wodeslavsky

[11] Patent Number: 5,913,236
[45] Date of Patent: Jun. 15, 1999

[54] PROTECTION SYSTEM FOR HYDRAULIC SYSTEMS AGAINST LEAKS/FLOODS, FREEZING AND PRESSURE

[76] Inventor: Josef Wodeslavsky, #5 Peter Lynas Ct., Tenafly, N.J. 07670

[21] Appl. No.: 08/861,900
[22] Filed: May 22, 1997
[51] Int. Cl.⁶ .......................... G08B 21/00; G01N 27/00
[52] U.S. Cl. .................. 73/40; 73/49.2; 73/861.41; 73/40.5; 137/312; 137/624.12; 340/605; 340/609; 324/71.1
[58] Field of Search ................. 137/488, 492.5, 137/513.5, 456, 495, 62, 246, 312; 73/49.2, 40, 40.5, 277, 378, 415, 861.41; 340/609, 604–606

[56] References Cited

U.S. PATENT DOCUMENTS

| | | | |
|---|---|---|---|
| 3,416,560 | 12/1968 | Bruno | 137/456 |
| 3,584,500 | 6/1971 | Diehl et al. | 73/39 |
| 3,776,249 | 12/1973 | Wailes et al. | 137/14 |
| 3,987,625 | 10/1976 | Swatty et al. | 60/431 |
| 3,995,472 | 12/1976 | Murray | 73/40 |
| 4,180,088 | 12/1979 | Mallet | 137/87 |
| 4,249,565 | 2/1981 | Brust | 137/495 |
| 4,730,637 | 3/1988 | White | 137/62 |
| 4,796,658 | 1/1989 | Caple | 137/312 |
| 5,040,409 | 8/1991 | Kiewit | 73/40.5 A |
| 5,058,421 | 10/1991 | Alexander et al. | 73/49.2 |
| 5,138,643 | 8/1992 | Sakamoto et al. | 378/34 |
| 5,240,022 | 8/1993 | Franklin | 137/1 |
| 5,267,587 | 12/1993 | Brown | 137/624.12 |
| 5,381,097 | 1/1995 | Takatori et al. | 324/512 |
| 5,425,396 | 6/1995 | Wodeslavsky | 137/488 |
| 5,520,209 | 5/1996 | Goins et al. | 137/246 |
| 5,616,830 | 4/1997 | Wodeslavsky et al. | 73/49.2 |
| 5,650,564 | 7/1997 | Wodeslavsky et al. | 73/49.2 |

*Primary Examiner*—Christine K. Oda
*Assistant Examiner*—J. David Wiggins

[57] ABSTRACT

A protection system for hydraulic systems, mainly for pipes, faucets, valves, boilers, furnaces, etc. which consists of a handling panel, a cut-off valve, a fluid leak detector, at least one pressure sensor, and a water shock absorber, and such a protection system can detects leaks or floods and will shut off the water pressure to the structure, and this protection system can be programmed to reduce the pressure in the system in order to maintain a state of low pressure in order to reduce the toll on valves, faucets, furnaces and pipes, etc as long as the user does not need to use the water or to open such valves, and this protection system will increase the pressure when it is needed, and this increase in pressure can be programmed by the user through the use of the "override" maneuver from any valve or faucet, and it will detect if the pressure needs to be increased to serve the needs of the water heating system if the cut-off valve shuts off the water supply to the structure, thereby preventing damage to the structure, and the protection system will let water flow within the system via the valves in order to prevent water freezing within the structure in very cold temperatures, thereby also preventing damage to the structure.

11 Claims, 8 Drawing Sheets

PROTECTION SYSTEM FOR HYDRAULIC SYSTEMS AGAINST LEAKS/FLOODS, FREEZING AND PRESSURE

BACKGROUND OF THE INVENTION

The present invention relates generally to safety devices for shutting off the fluid supply when there is a fluid drip, leak, and ordinary water usage. More particularly, the aim of the present invention is to improve and combine my three previous inventions, U.S. Pat. No. 5,650,564 and U.S. Pat. No. 5,652,970 and U.S. Pat. No. 5,425,396. Another aim of the present invention is to solve the problem of hydraulic systems being shut off by the cut-off valve while keeping fluid pressure to heating systems that still need, a water supply even when the cut-off valve has been activated in case of a water leak. Another aim of this invention is to notify the user that the cut-off valve is going to disconnect the water supply. One means of informing the user is by reducing the water pressure before cutting off the fluid supply. Another aim of this invention is to offer a solution to the problem of the hydraulic system being shucked by water pressure waves that can negatively influence the water-sensing device. Yet another aim is to retain the smallest possible pressure in the system when the fluids are not being used, and at the same time permit the fluids to flow in cases where the temperatures approach the freezing point.

DESCRIPTION OF THE PRIOR ART

It has been found that the chief enemies of hydraulic systems are high pressure, water leaks, and water freezing. The present invention will address and provide solutions to these problems.

My previously-mentioned inventions consist of a sensing device that detects fluid movements by sending an electric signal to a handling panel. The present invention will integrate such a sensing device into the cut-off valve. The result is simplified and reduces production costs and maintenance. Also integrated into the same device is a fluid pressure variation valve which will keep the fluid pressure low in order to reduce potential harm to the system by keeping pressure high only when water is being used, since high pressure takes a toll on faucets, boilers, valves and piping. It is known that most systems that deal With flood protection use a cut-off valve to shut off the water supply in case of a flood. The second aspect of the present invention is the addition of a second sensor to the hydraulic system. This sensor will detect the operation of a hydraulic heating system by sensing a pressure drop in such a heating system. This drop in pressure is a symptom or a result of a dangerous and perhaps lethal combination of a cut-off valve shutting off all fluids and the heating system relying on this very fluid pressure. Since the heating system relies on the fluid supply, there is a critical need to keep the fluid pressure up at all times without exception. Since the only purpose of the cut-off valve is to shut off the fluid supply, a scenario in which the fluid is cut off and the heating system is deprived of its essential fluid is imminent. A normal hydraulic heating system deprived of its fluid supply while in operation results in overheating, which could lead to damage, destruction and even explosion of the heating system. Moreover, in freezing conditions the collapse of the heating system could lead to bursting of pipes as water expands in such low temperature conditions.

To improve the performance of my previous invention is another aim of the present invention by notifying the user that the "allotted time for continuous fluid use" which is set by the handling panel (as suggested in my previous invention) is about to end. This notification to the user that the water supply is about to be shut off is accomplished by reducing the fluid flow for a preset amount of time. After this notification, the system waits for a user response, allowing the user ample time to respond and perhaps request a time extension of "continuous fluid use." Such a user request will be referred to as an "override request." The user could also choose to shut off the fluid flow manually, avoiding either shifting the system into an "override" state or causing a general sudden stoppage of fluids. Only after another preset amount of time will the system actually shut off the fluid flow completely.

Another aim of the present invention is to integrate a water pressure level control valve into the same sensor and a cut-off valve in order to reduce the water pressure during such time as such pressure is not in use.

Another aim of the present invention is to create a means to notify the user that the water temperature is very low before such low temperature freezes the water and causes damage to the pipe system.

The last aim of this invention is to eliminate pressure waves in this water flow detecting system. This is accomplished by adding a shock absorber in the front of this cut-off/sensing device.

DETAILED DESCRIPTION OF THE DRAWINGS

Figure 1:
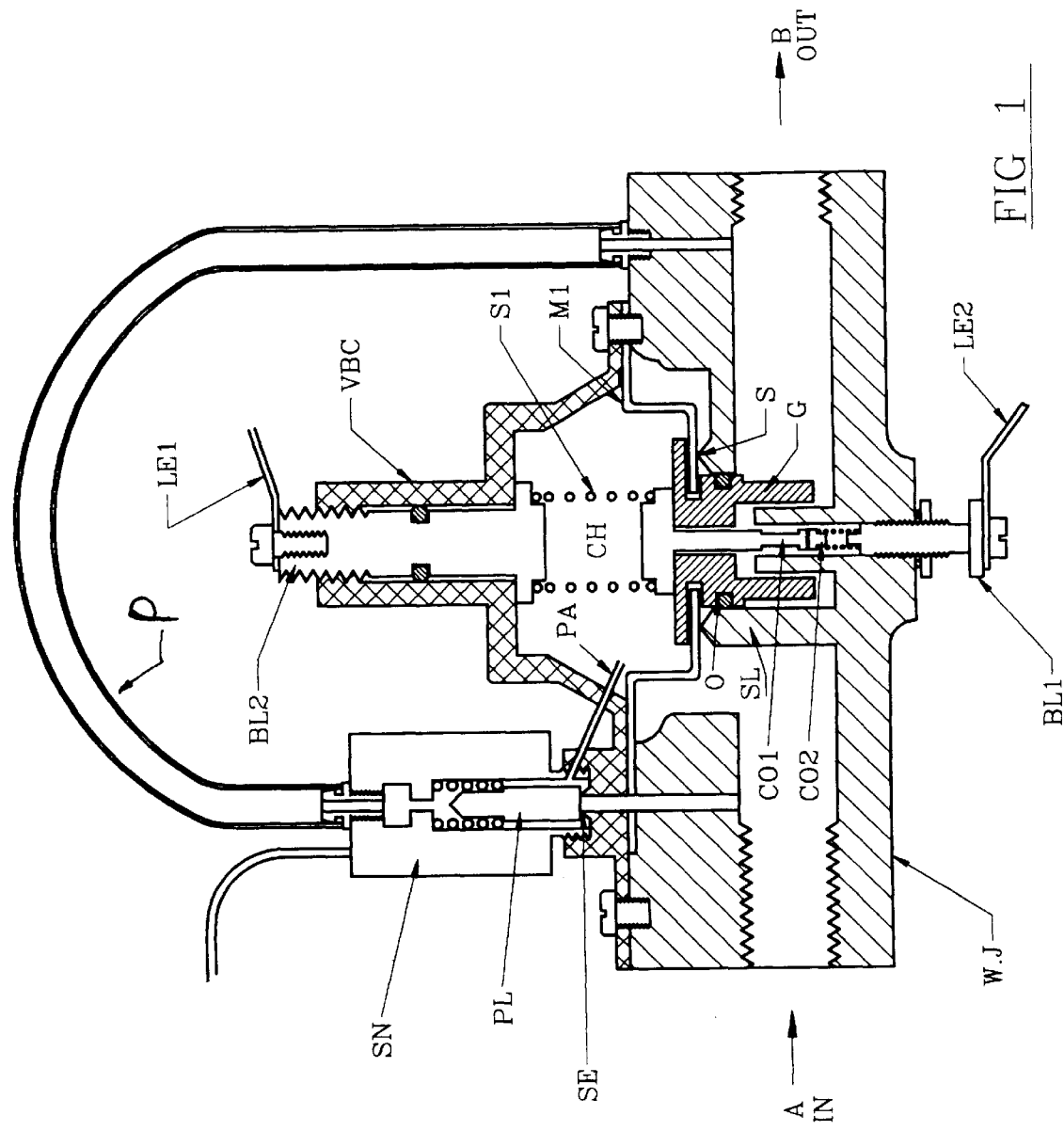
FIG. 1 is a diagram of a fluid movement sensing device integrated in a fluid cut-off valve. The cut-off valve is normally open.

FIG. 1 illustrates a fluid movement sensing device integrated in a fluid cut-off valve. A valve body WJ, made from electrically-resistant material, has a fluid inlet A and a fluid outlet B. A membrane means M1, situated on a guide G made of electrically-resistant material, separates inlet A from outlet B if spring S1 urges membrane M1 against seat S and if O-ring O seats in its sleeve SL, defining a closed position. On the valve body cover VBC a solenoid SN is mounted in which plunger PL is urged against seat SE. Chamber CH, defined between the valve body cover VBC and membrane M1, can be vented to outlet B if solenoid SN is not energized via pipe P.

Whenever there is no fluid movement between inlet A and outlet B, membrane M1 is in the closed position, in which case an electric contact is formed between contact CO1 and contact C02. When membrane M1 is closed, current flows from lead LE1 through spring S1 through contacts CO1 and CO2 through spring S2 to lead LE2. Thus, when there is no fluid movement between inlet A and outlet B, a closed electrical circuit is formed between leads LE1 and LE2.

Whenever fluid pressure at outlet B drops, the pressure above membrane M1 also drops, since the chamber above the membrane is connected to outlet B via pipe P. This pressure differential between fluid inlet A and outlet B causes the membrane to be lifted from its seat against the force of spring S1. If membrane M1 is lifted, the electrical contact between leads LE1 and LE1 breaks. Thus, membrane movement results in breakage of the electrical circuit. The addition of O-ring O makes the device very sensitive to minute fluid drips, since the O-ring blocks the fluid flow from inlet A to outlet B and causes the membrane to be lifted from its seat by a relatively large amount in order to cause a fluid flow between inlet A and outlet B. Even though membrane M1 is lifted, water is still not flowing from inlet A to outlet B. This means that the electrical circuit is broken first, while the water pressure continues to drop, and only then does water movement occur between inlet A and outlet B. Thus the membrace functions like a valve and like a sensor combined.

The present addition of solenoid SN changes this sensor to a fluid cut-off valve. In case the solenoid is activated, plunger PL moves up and with its upper part acts like a valve to disconnect chamber CH from outlet B and simultaneously opens chamber CH to the inlet pressure at inlet A. Thus, the hydraulic pressure on the bottom of membrane M1 equalizes to the pressure on the top of the membrane plus the force of spring S1. Therefore, if the hydraulic pressure is being equalized, this spring's force on membrane M1 creates a force on top greater than the force below it, and this will keep membrane M1 seated against seat S, disconnecting the passage between inlet A and outlet B if solenoid SN is off and if the fluid pressure drops at outlet B, it must drop to the extent of the force of spring S1 in order to permit membrane M1 to be lifted and open the water flow.

Bolts BL1 and BL2 can be adjusted to vary the sensitivity of the sensor to leaks. Adjusting the bolts can set the sensor to detect only leaks of a certain size or larger.

Figure 2:
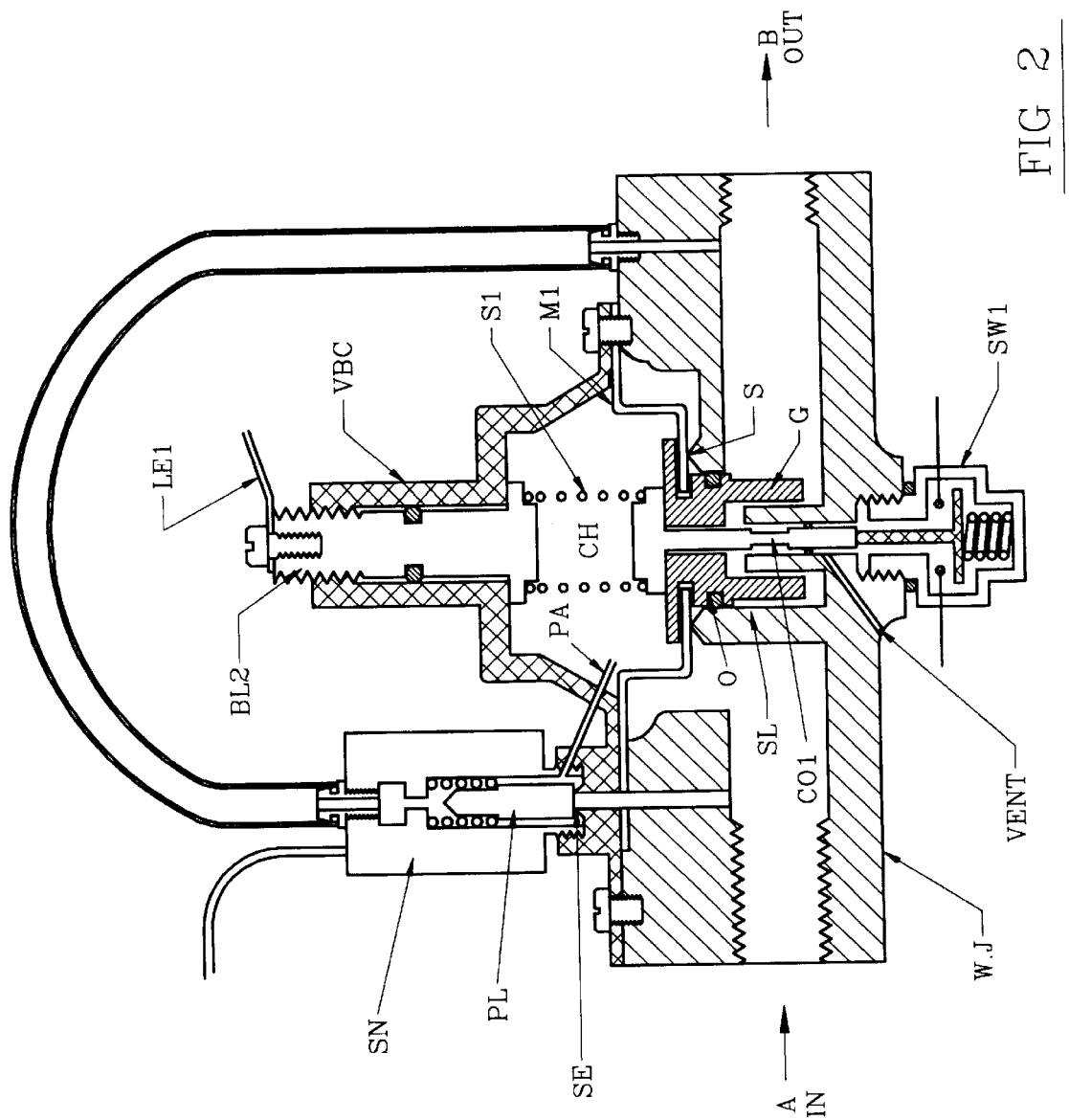
FIG. 2 is a diagram of a fluid movement sensing device integrated in a fluid cut-off valve with an external switch.

FIG. 2 illustrates the same device illustrated in FIG. 1, but in which the electrical contacts are external, located in switch SW1.

Figure 3:
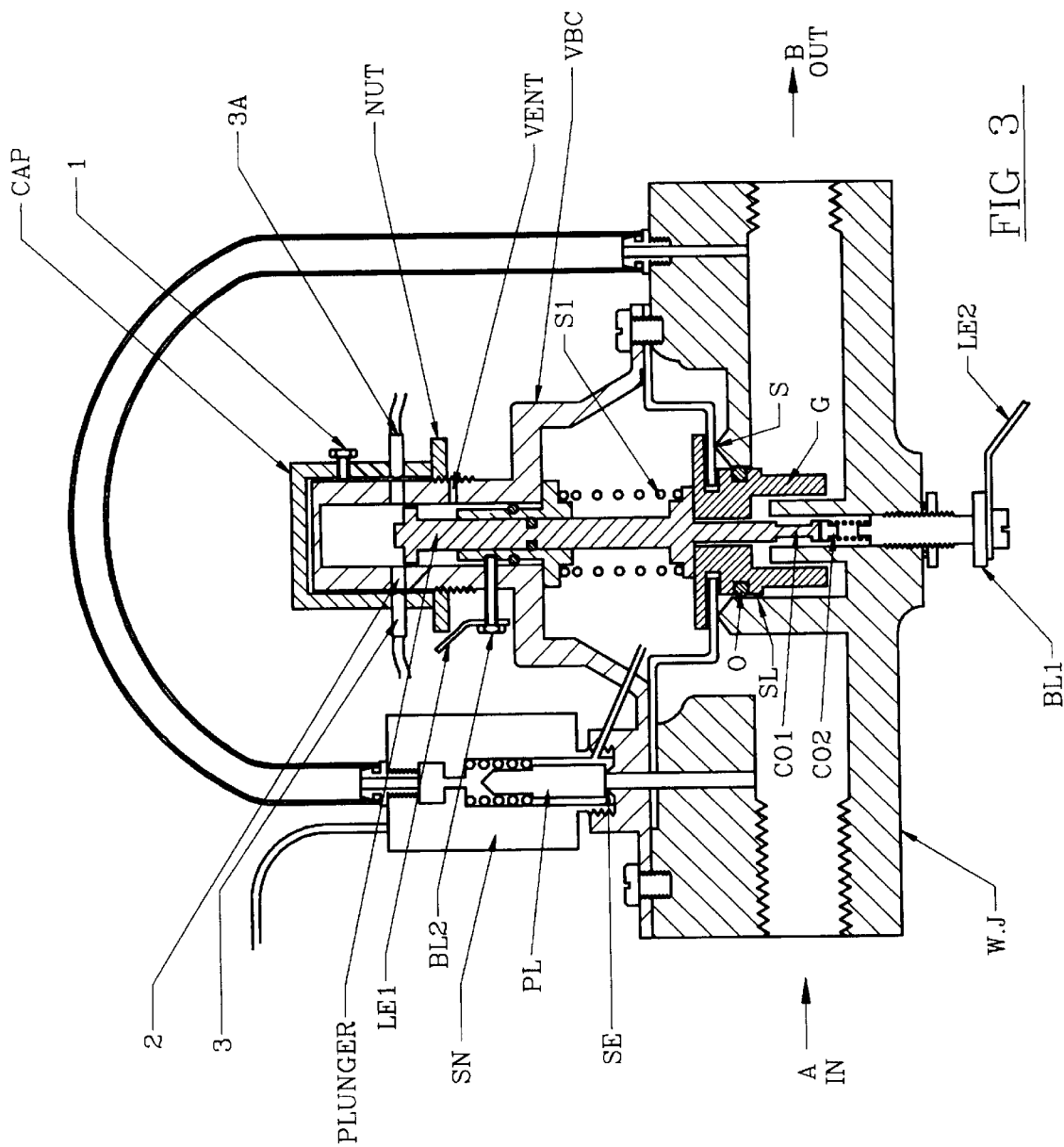
FIG. 3 is a diagram that shows a water flow measuring device.

FIG. 3 illustrates the same embodiment as FIG. 1. The difference is that to the center of the membrane is connected a plunger. At the upper part of said valve body cover VBC is mounted a cap. Into said cap is mounted an emitting infrared diode 3A which is connected to electrical power. On the said cap, mounted opposite diode 3A is mounted photo transistor 3. The said emitting diode 3A emits infrared light onto said photo transistor 3. In return, said photo transistor 3 will produce certain electrical resistance. Under full power of said emitting diode (with no plunger disturbance) there is full certainty of electrical resistance. Whenever said plunger will be lifted by said membrane which will be pushed by water movement, the plunger will block certain emitting infrared light emitted by diode 3A from the view of photo transistor 3. This will decrease the electrical resistance of photo transistor 3. The more the plunger gets between diode 3A and transistor 3, the less the electrical resistance of transistor 3. Said decrease in the electrical resistance of transistor 3 will be measured by known means such as an ohmmeter. In return, the height of said plunger can be calculated. Since the plunger is bound to the membrane, the location of the membrane relative to its seat is directly calculable. From the duration of the electrical resistance, how long said membrane was in the open position can also be calculated.

The location of the membrane relative to its seat is directly related to the amount of water flowing through the device. Measuring the location of the membrane is actually another way of measuring the amount of water flow between the inlet and outlet of said device.

The electrical output of said photo transistor can be connected to a handling panel which can measure the water flow. Thus, said device can be considered to be a water meter.

Measuring the amount of motion of said plunger by means of diode 3A and transistor 3 is only one of the known accurate ways to measure physical motion. Another way is by means of a potentiometer that can be moved by said plunger.

The electrical connection and disconnection between leads LE1 and LE2 can indicate the flow and nonflow of water in said device.

Spring S1 will work against the water pressure in the system, acting as a water regulator and helping to accurately measure the water flow.

Although parts of the invention were described by hardware circuitry, such embodiments are merely illustrative of the function to be achieved. It is clear to a person skilled in the art that software or hardware or a combination of the two can be designed to achieve the same or substantially the same function of such hardware circuitry.

Figure 4:
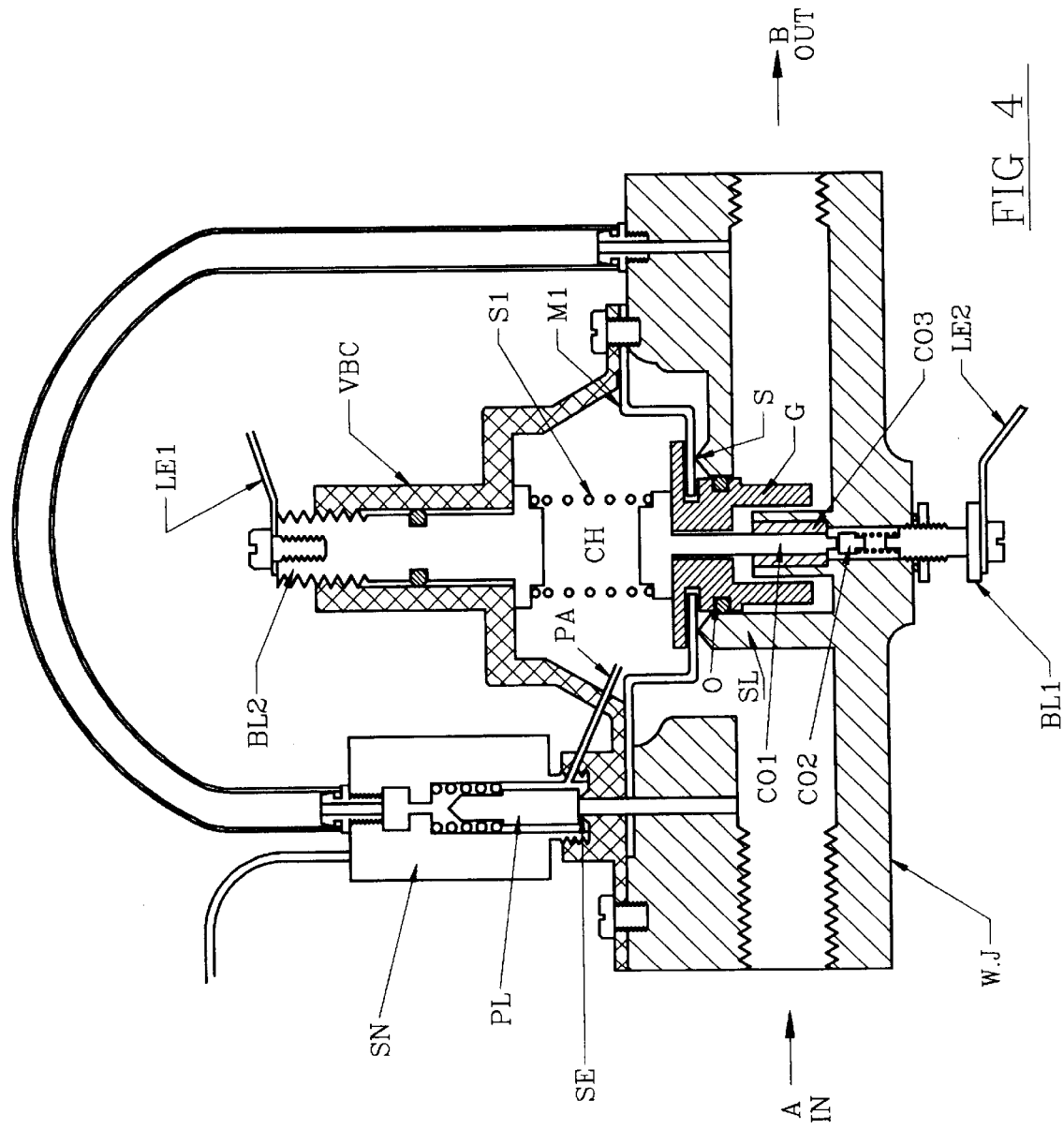
FIG. 4 is a diagram of a fluid movement sensing device integrated in a fluid cut-off valve with internal contacts insulated from impurities in the water.

FIG. 4 illustrates the same embodiment as FIG. 1. The difference is that the internal contacts CO2 and the contact which sits at the end of plunger CO1 are insulated from impurities in the water or fluid. The insulation is accomplished via the plunger CO1 being sliding fit, with almost no clearance, to bushing CO3. Thus, no impurities in the fluid can penetrate and cause a fault in the electrical contacts.

Figure 5:
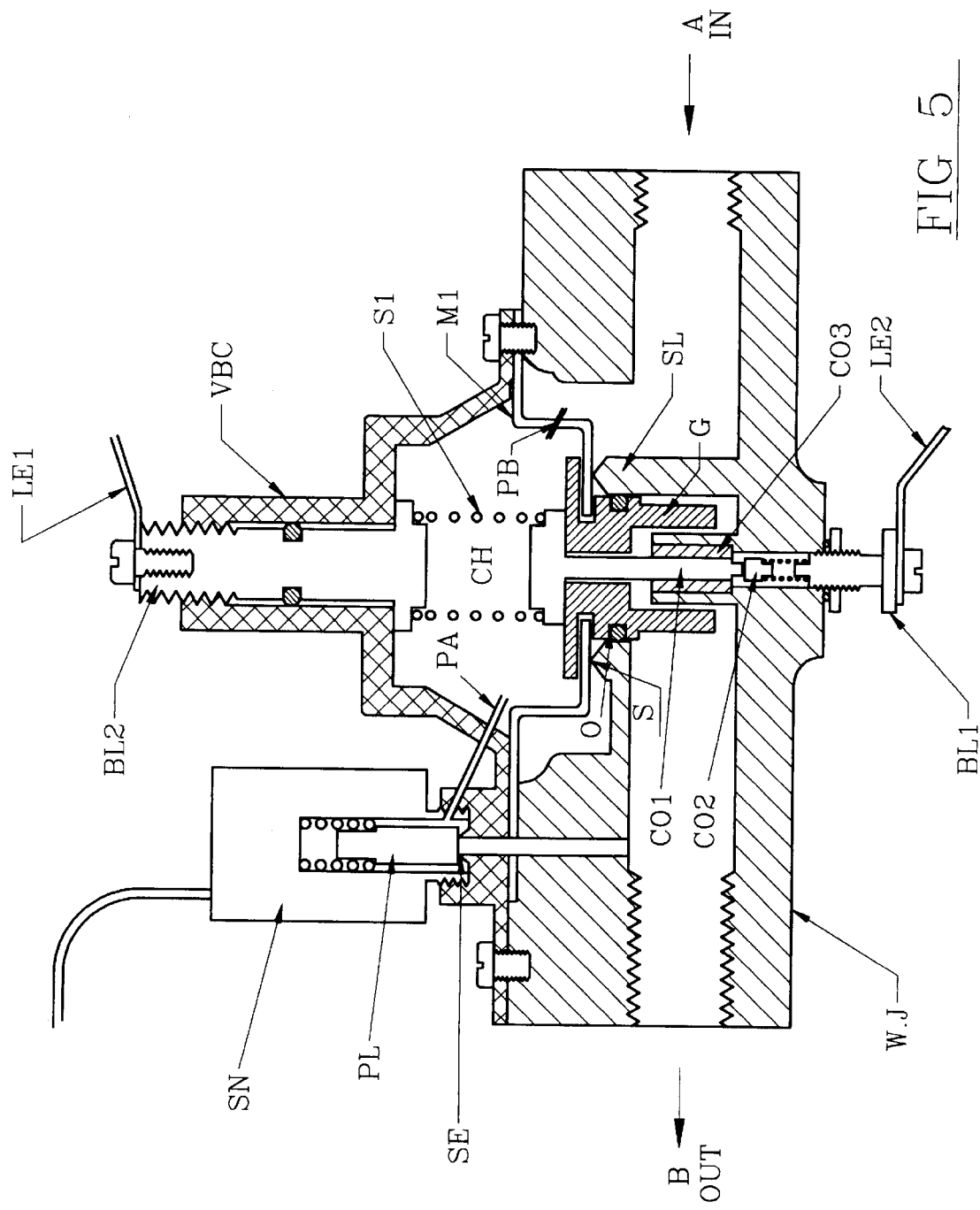
FIG. 5 is a diagram of the same device as FIG. 1, but the cut-off valve is normally closed.

FIG. 5 illustrates the same embodiment as FIG. 4. The difference is that the cut-off valve is always in the closed position and in order for it to be opened solenoid SN must be energized. The water from inlet A always enters above membrane M1 via passage PB and equalizes the hydraulic pressure on both sides of said membrane. Spring S1 will force the membrane to sit on seat S in the closed position. If solenoid SN is energized, plunger PL will move from its seat and chamber CH will be connected to outlet B via passage PA. If a faucet is opened, the water pressure will drop at side B. The water pressure in chamber CH will drop also via passage PA since passage PB is smaller than passage PA. The water from side A will not be able to enter chamber CH as fast as the speed with which it drains, so the pressure from side A will not drop as fast and will stay greater than the pressure in chamber CH, resulting in pushing the membrane up from its seat against spring S1 to the open position and letting the water flow from A to B. It should be noted that the solenoid that controls the water opening to chamber CH could be replaced by other known means, such as an electric motor.

Figure 6:
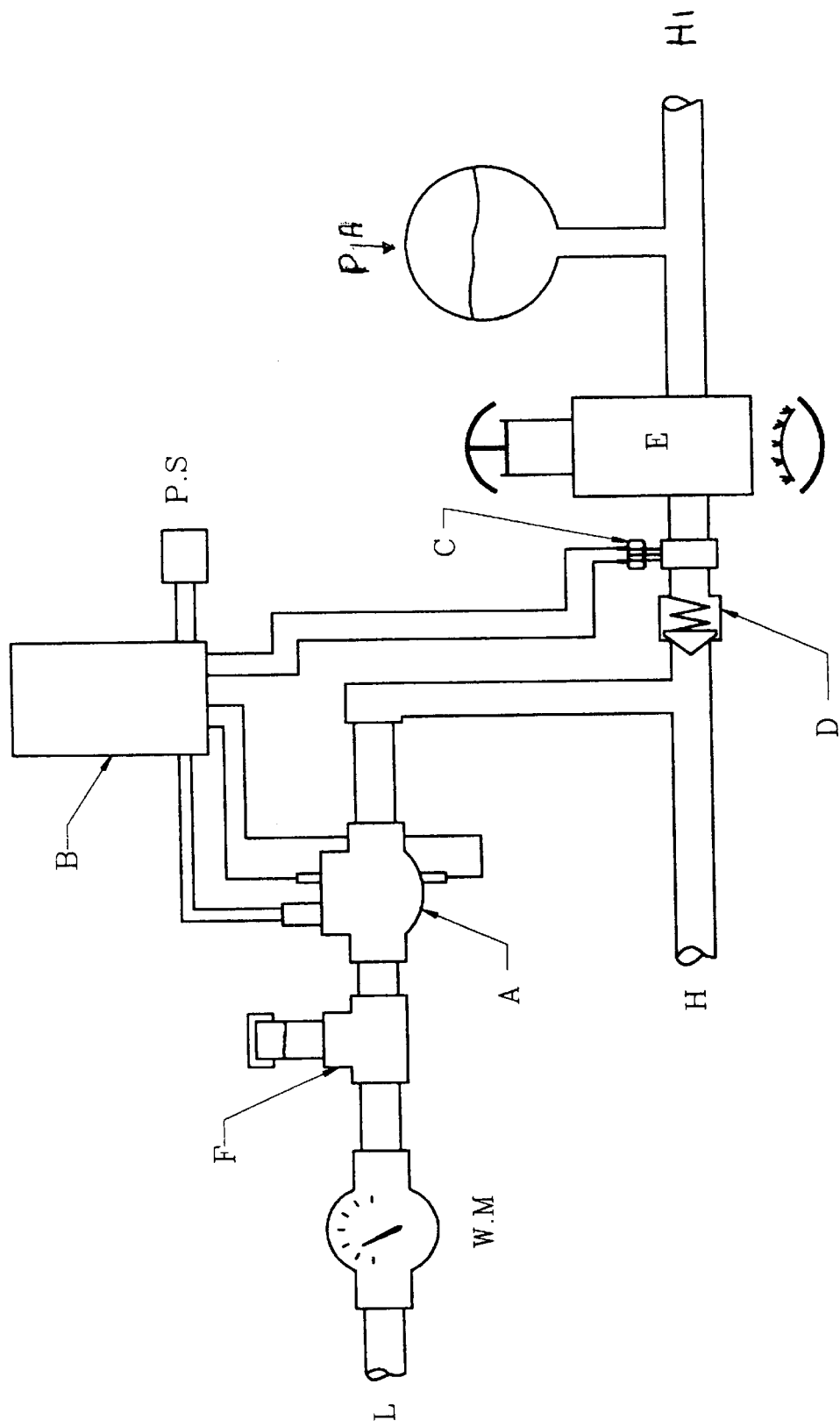
FIG. 6 is a diagram of the complete system for protecting a hydraulic heating system.

FIG. 6 illustrates the installed water leak detection system, which contains a feature to protect the heating system. The water is supplied via the water meter WM and line L, which feeds the furnace E as installed between lines H and G, where G also denotes the outlet of the heating system. The water supply line contains a shock absorber F designed to reduce pressure surges/changes (caused by neighboring water lines or faucets being opened or closed) that would otherwise be propagated into the leak detection system and heating system lines. A sensor built into cut-off valve A will send information about its electrical status to the handling panel B, which is fed by power supply PS. To said handling panel is also connected pressure sensor C, which is mounted on the line which supplies water to the furnace E. It is very important to continue to supply water to said furnace even if the cut-off valve receives a command from the handling panel to close the water supply in case of a leak. Said handling panel is designed to open a pressurized water supply to go to said furnace. If the normally open pressure sensor C senses that the water pressure to the furnace is too low, it will open its contacts. The handling panel B will sense this and give a command to the cut-off valve to open momentarily so that pressure builds up in the pressure accumulator PA that usually is provided with a furnace. The one-way valve D will maintain the pressure within the heating system even if pressure drops at line H, which supplies water to the structure.

The innovation is the combination of the handling panel, the sensor cut-off valve, and the pressure sensor. This innovation avoids the need to put additional piping before the cut-off valve to run separately to the furnace, bypassing the cut-off valve, since most heating systems function on low pressure of 18–20 psi vs, 80–100 psi that ordinary water systems within the house use. Should the ordinary water system in the house shut off by command of the handling panel in case of a leak, the water pressure will drop. A quick opening and closing of the cut-off valve to feed said furnace with full pressure could cause additional water leaks to the structure, but this potential damage is of small account compared to destruction of the heating system should the water supply be cut off completely. This pressure sensor signal will activate an alarm to notify the user that there is a leak in the heating system. The shock absorber in front of the valve/sensor is meant to absorb the hydraulic shock waves in the water in order to keep the valve/sensor from shaking as a result of the opening and closing of the water by neighbors.

Figure 7:
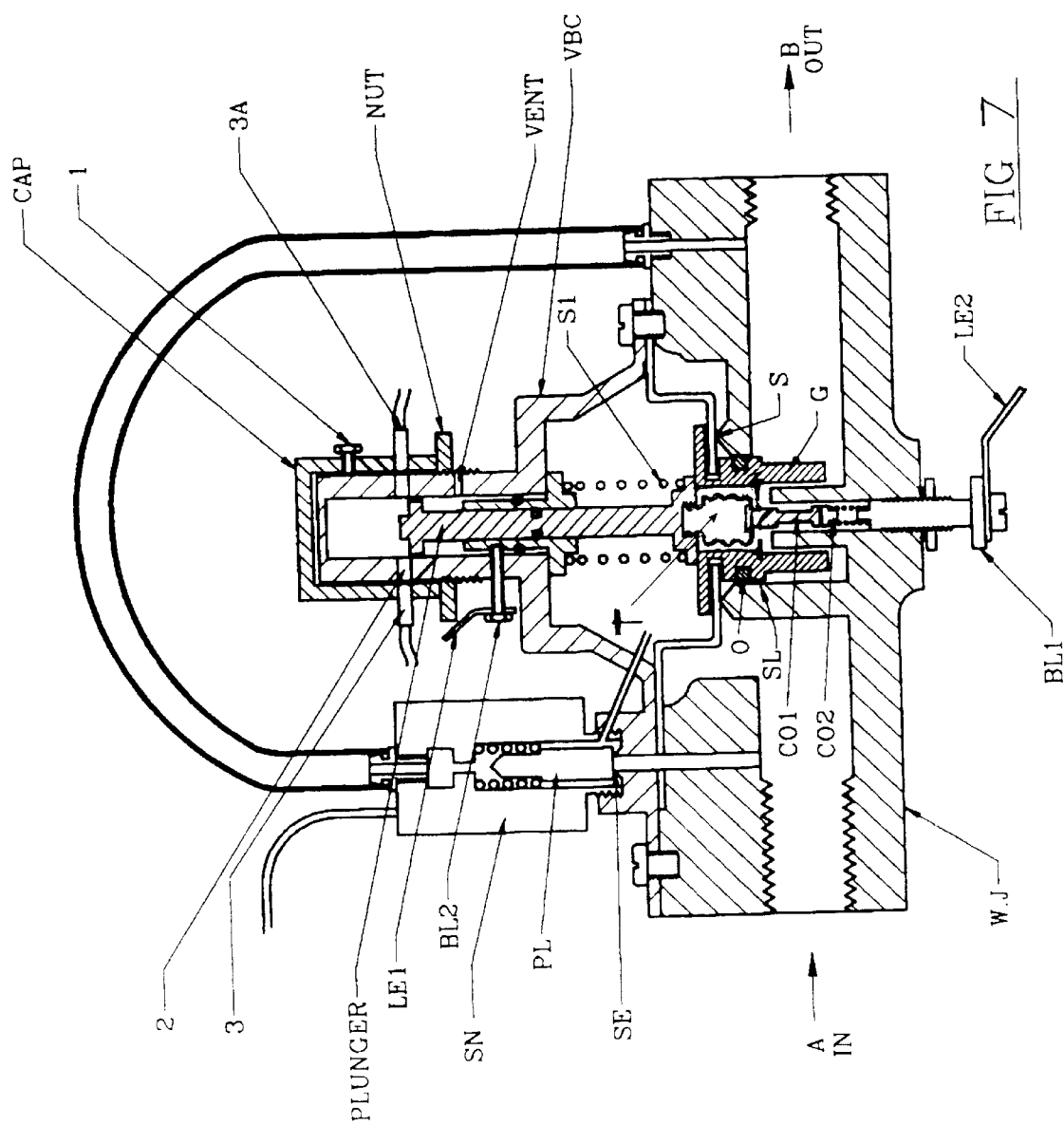
FIG. 7 is a diagram of a valve that consists of a thermostat to warn that water temperatures are approaching freezing.

FIG. 7 illustrates the valve/sensor that also contains a thermostat T which is situated in the guide G. This thermostat will shrink in low temperatures that approach the freezing point, pulling contact CO1 from contact CO2. These contacts will not touch each other even when membrane M1 sits on seat S. In case the membrane is all the way down, sensors 3 and 3A will send a signal to handling panel B that its position is down, simultaneously there is supposed to be a contact between contacts CO1 and CO2, in case there is no contact between contacts CO1 and CO2. Said handling panel will distinguish from the break of the electrical circuit between leads LE1 and LE2, and such a signal can be used to drain water via an automatic toilet flushing system (such as those systems in public toilets or home sinks that function on infrared sensors) in order to let warmer water from the cold water supply run via the pipes. The moment that new warmer water from the main supply arrives at the thermostat, said thermostat will expand and will establish a new electrical contact between contacts CO1 and CO2, which in turn will notify the handling panel B to stop flushing the toilet or the automatic valve at the sink. It should be noted that there are several kinds of such valves that control the flow of fluids, electronically.

The other feature of this innovation is notification of the user by handling panel B that the time of continuous running of the water supply is about to elapse. This feature improves my inventions U.S. Pat. No. 5,650,564 and U.S. Pat. No. 5,652,970, whereby the handling panel shuts off the water flow after a preset amount of time. If, for example, a user is taking a shower, a way to notify said user that the time that has been set to shut off the water supply is about to elapse is to reduce the water pressure so that the user would feel that the water pressure stream has been reduced and would be alerted to quickly shut off and once again turn on the water flow, which in my previous invention was called the "override maneuver." The water pressure reduction is a result of closing and opening the solenoid which controls the pressure on top of the membrane, momentarily closing and then reopening the water supply a few times results in reducing the water pressure in order to notify the user that the water supply will soon be shut off. This feature is important in places where there is a water shortage.

In my previous invention (Patent 5424396) I described the instrument that reduced the water pressure to almost zero when it is not needed (as when no water is being used). Only when someone opens a faucet will the water pressure be increased to normal levels. The present invention can achieve the same result with the same three mentioned instruments: a handling panel which consists of a preprogrammed chip, a sensor/cut-off valve and a pressure sensor, with the addition of an extra pressure switch.

Pressure sensor C that was mentioned in FIG. 6 sends a continuous signal to handling panel B. An extra switch can be added to said panel and to the pipe system, and by setting said extra switch to a high set pressure it can activate the solenoid by itself or via the handling panel to open pressure to the top of said membrane, in effect shutting off the water flow as long as the water pressure is above a certain high preset level, which is set by the high pressure sensor and every time such pressure drops below that low pressure level set by sensor C it will open its contact and handling panel B will command the solenoid to open the water flow, keeping the preset high pressure operating within the system for a preset amount of time only to permit the user to use the water and then reduce the pressure again.

In my patent applications Number U.S. Pat. No. 5,650, 564 and U.S. Pat. No. 5,656,970 I described the override feature that will be activated by opening and closing the water flow at any faucet. This override maneuver can be used to increase or decrease the water pressure as well by sending a signal to the handling panel B with the same override maneuver. Such a signal can be recognized and analyzed by said handling panel, which can then send a signal back to the solenoid which will open or close water pressure to the top of the membrane, closing or opening the water flow from the inlet to the outlet of the cut-off valve until the pressure in the system drops or increases. The water flow will resume only when pressure sensor C commands it. Thus this combination of methods using almost the same elements will function as a variable water pressure regulator.

Such a water pressure regulation system can function with two pressure sensor switches. The first switch will sense the maximum high pressure, and the second switch will sense the low pressure point. Handling panel B will, receive a status signal from said switches. In order to maintain high, pressure when it is needed, if all valves and faucets are closed the pressure within the system will go, to maximum high. The high-pressure switch will send the signal "I am high" and the handling panel will send a signal to shut off the water, with the result that the water flow in the structure will be disconnected from the water supply and the pressure will start to drop and will be kept low. The moment that the water pressure arrives at a certain, very low point, the low-pressure switch will open. Activation of the low-pressure switch will alert the handling panel to activate the solenoid to raise the pressure until the low-pressure switch closes. If any faucet in the system is open the water pressure will not increase and the handling panel will have distinguished that if after a certain period of time, the low pressure switch has not closed, it means that water is being used in the system. Said handling panel will change its mode and keep the solenoid off until the pressure has increased to the high-pressure level, giving the user high pressure throughout the system. Thus, by adding the extra switch we get high and low pressure within the system. Once the pressure has remained constant for a preset amount of time the sensor part of the cut-off valve will be able to distinguish if water is being used. If it is, the electrical circuit between contacts CO1 and CO2 will break and this new status will be read by the handling panel to keep the pressure high. The moment those contacts stay closed for a preset amount of time the handling panel will read this and will give the command to reduce the pressure again.

Figure 8:
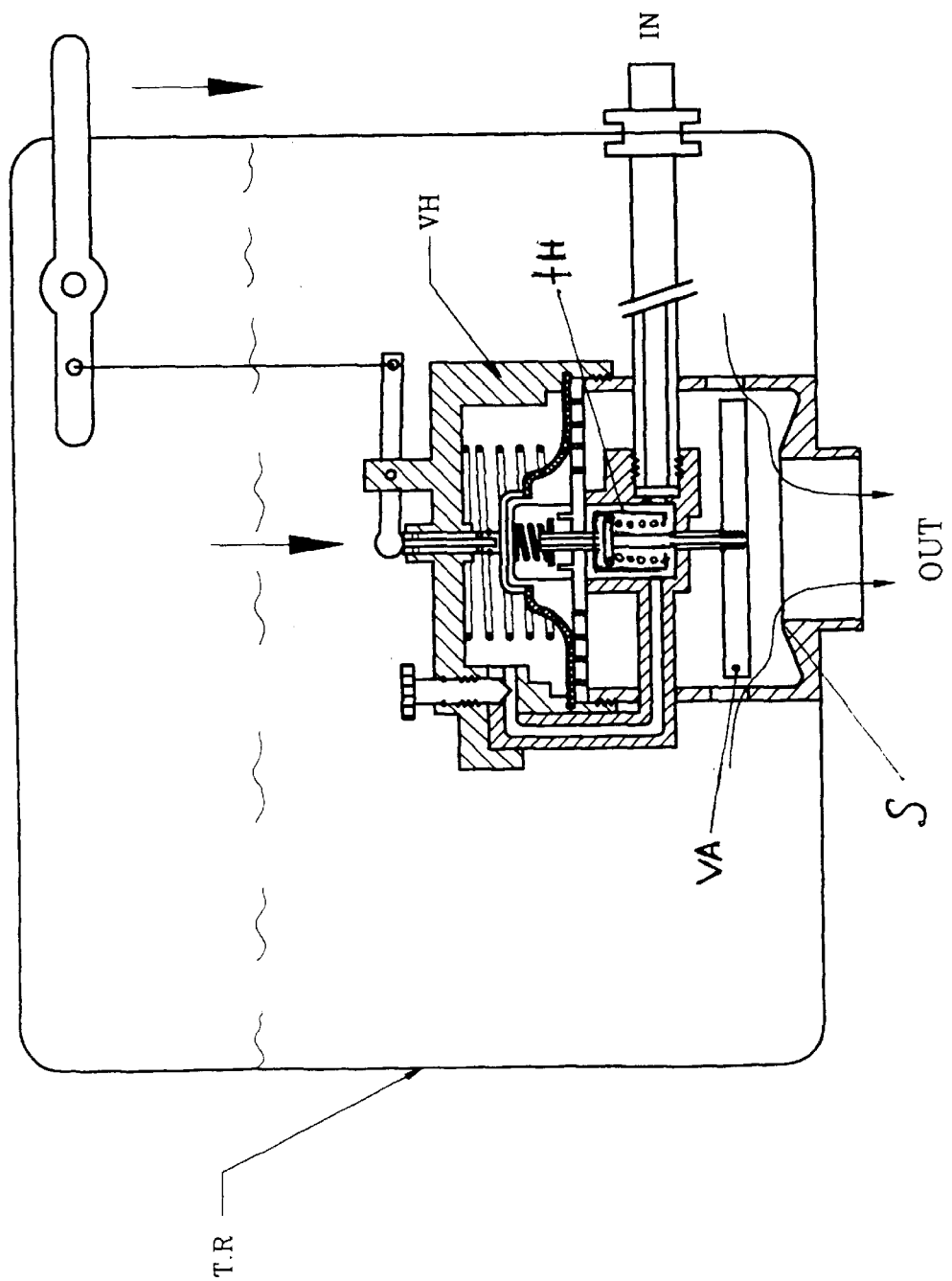
FIG. 8 is a diagram of such a thermostat being used in a toilet valve.

FIG. 8 illustrates a toilet dumping water valve VH with a built in thermostat TH that will shrink when the water temperature approaches the freezing point. In normal temperature conditions the lower valve VA will sit on its seat S and close the water outlet OUT from the toilet tank TR to the toilet bowl. This thermostat mechanism will permit water to drain until new warmer water arrives from the main water supply in order to dump the near-freezing water from the pipes, preventing them from possibly bursting. Once the warmer water arrives at the toilet tank it will hit said thermostat, expanding it and closing said lower valve against its seat. Only as one example, it should be noted that this thermostat can be constructed of a mercury element that shrinks or expands under the influence of changing temperatures or of another known mechanism that takes into consideration the fact that water expands at 4° C. before starting to shrink again at 0° C. Also, such, a thermostat can function the other way around to expand under low temperature and push up such a valve from underneath and not let it close on its seat and permit water to drain.

While what has been shown and described are at present considered the preferred embodiments of the present invention, it will be obvious to those skilled in the art that various changes and modifications may be made therein without departing from the scope of the invention as defined by the appended claims.

I claim:

1. A fluid drip detector which is integrated with a fluid cut-off valve in a sensing device assembly comprising:

a valve housing having a first bore in one end and a second bore at the other end, and at the end of the second bore is disposed a seat;

a valve membrane means in selective contact with said seat and allowing a variable close location relative to said seat, the valve membrane means surface being exposed to fluid pressure such that when fluid pressure drops at the second bores the fluid pressure at the first end urges the membrane means to move from the seat in a detectable membrane movement that signifies a fluid drip status or fluid movement condition, such membrane means movement also allowing fluid flow from the first end to the second end; and a housing cover situated on said membrane/valve in order to define three chambers, a first chamber at the first bore, a second chamber at the second bore and a third chamber at with selective fluid communication to each or both of said bores, whereby whenever said membrane is positioned away from said seat there is an open flow of fluid between the first and second bores thus defining a fluid flow condition for this first position, and if said membrane/valve means is positioned to engage said seat, this alternate position of said membrane/valve means is defined to yield a no flow fluid condition; and an electrical switching means integrated to said valve/membrane means, whereby said membrane movement changes the electrical status of said electrical switch.

2. A valve housing as in the fluid drip detector/fluid cut-off valve of claim 1, further having an electrical valve means for opening and closing water pressure or fluid pressure applied to one side of said valve membrane in order to expose said one side to pressure applied for equalizing the pressure at both sides of said membrane in order to change said valve housing to a fluid cut-off valve by energizing or de-energizing said electrical valve means.

3. A fluid drip detector as in claim 1 in claim 2 for detecting the presence of drips and leaks of fluid via measured changes in electrical resistance via electrical contact comprising:

a hollow housing for permitting fluid flow and passage through, the housing having a seat;

a door means situated in a membrane which is situated on the housing with a cover situated in said housing and urged by said membranes it against the housing, the door closing and opening fluid communication through the housing; and a mechanical switch having communication with the door means, whereby the switch opens and closes if the door gives to fluid pressure differential between both surfaces of said door means before fluid passes through the housing.

4. A fluid detector as claimed in claim 1 which consists of a means to measure the amount of fluid drip or fluid movement flowing through the said device by measuring the location of said membrane relative to its seat.

5. A fluid drip detector a claimed in claim 1 as claim 4 which consists of means to measure the amount of fluid or water flowing through the said device by measuring the location of staid membrane relative to its seat which measurement means is connected to a handling panel that keeps track of an elapsed time, the amount of water flowing per unit time and the actual time of the water flow, hence performing a function as a water meter.

6. A fluid drip detector as claimed in claim 1 as claim 2 whereby the internal electrical contacts are insulated from impurities in the fluid.

7. In any construction that uses water for drinking, washing, heating or any other, usage, a thermostat element means in the fluid drip detector/fluid cut-off valve of claim 1 that controls valves which control fluid movement in pipes, and such thermostat element means being influenced by changing temperatures will open and close fluid flow in order to maintain non-freezing water in said pipes by letting warmer water push the colder-water out of the system.

8. A fluid cut-off valve which is integrated with a fluid drip detector in one assembly comprising:

a hollow housing which consists of at least two bores, the first bore terminating to an opening, the second bore terminating with a seat, and said bores having selective fluid, communication through said seat and said opening, and into said housing is disposed a valve which is situated in a membrane having a surface capable of exposure to pressurized fluid, and a housing cover;

a housing cover situated on said membrane/valve in order to define three chambers, a first chamber at the first bore, a second chamber at the second bore and a third chamber at with selective communication to each or both of said bores, whereby whenever said membrane is positioned away from said seat there is an open flow of fluid between the first and second bores for a first position that signifies a fluid drip status or fluid condition, and if said membrane/valve engages said seat for a sums position, defined a no-flow fluid condition, and said membrane/valve means will consist of an electrical contact, defined a first electrical contact; and said first electrical contact has an electrical connection to an outside lead of said housing, and into said hollow housing is disposed a second electrical contact which makes selective communication with said first contact, and said second contact has an outside lead whereby when said membrane/valve means engages said seat, said first and second contacts are in contact and in an electrical status of minimum electrical resistance to define a closed electrical circuit between said outbside leads, and when said membrane/valve means is disengaged from said seat, said first and second contacts are in an electrical status of maximum electrical resistance, and said membrane/valve means is biased by an urging means to force said membrane/valve means to said seat in no fluid flow condition and simultaneously biasing said electrical contacts into the closed mode whereby whenever hydraulic pressure drops at the second bore and at said third chamber, said membrane/valve means will be pushed from said seat by the hydraulic pressure in said first bore, causing said electrical contacts to go to high electrical resistance mode and transmitting such information to said outside leads.

9. A fluid cut-off valve which consists of a fluid drip detector as in claim 8, further comprising a rod to lead the valve/membrane means to guide it to the closed and open positions, and said rod consists of an adjustable or stationary contact in order to adjust the sensitivity of said drip detector.

10. A fluid cut-off valve which consists of a fluid drip detector as in claim 8, further comprising an electrical operating valve to open or close pressurized fluid to the surface of said valve/membrane means in order to equalize the pressure on both sides of said membrane so the urging means on said membrane will press it to said seat to close fluid communication between the inlet and outlet of said fluid cut-off valve and simultaneously close the electrical circuit between said electrical contacts.

11. A fluid cut-off valve which consists of a fluid drip detector as in claim 8, intended for installation in a set of pipes of a piping system subject to low temperature conditions further comprising a thermostat element means that shrinks or expands by fluid temperature changes that will activate or deactivate fluid flow in the piping system in order to keep said pipes from freezing.

* * * * *

UNITED STATES PATENT AND TRADEMARK OFFICE
CERTIFICATE OF CORRECTION

PATENT NO. : 5,913,236
DATED : May 27, 1997
INVENTOR(S) : Josef Wodeslavsky

It is certified that error appears in the above-identified patent and that said Letters Patent is hereby corrected as shown below:

Column 7, claim 1,
Line 47, should read --a valve membrane means in a selective contact with said seat and allowing a variable close location relative to said seat --
Line 50, should read -- drops at the second bore --

Column 8, claim 2,
Line 5, should read -- valve as claim 1 --
Line 8, should read -- side to pressure applied for equalizing the pressure at --

Column 8, claim 3,
Line 12, should read -- fluid drip detector as in claim 1 and claim 2 for --
Line 18, should read -- a door means situated in a membrane which is situated in the housing and urged said membrane
against the housing and a cover situated on said housing and urged said membrane against said housing --

Column 8, claim 4,
Line 28, should read -- means to measure the amount of fluid drip or fluid --
Line 29, should read -- movement flowing through said device by measuring the --

Column 8, claim 5,
Line 31, should read -- a fluid drip detector as claimed in claim 1 and claim 4 --
Line 33, should read water flowing through said device by measuring the --

Column 8, claim 6,
Line 39, should read -- a fluid drip detector as claimed in claim 1 and claim 2 --

Column 8, claim 8,
Line 55, should read -- fluid (delete the comma) --
Line 68, should read -- position that signifies a fluid drip or fluid flow condition --

UNITED STATES PATENT AND TRADEMARK OFFICE
CERTIFICATE OF CORRECTION

PATENT NO.   : 5,913,236
DATED        : May 27, 1997
INVENTOR(S)  : Josef Wodeslavsky It is certified that error appears in the above-identified patent and that said Letters Patent is hereby corrected as shown below:

<u>Column 9, claim 8,</u>
Line 2, should read -- seat for rest position defined an no flow fluid --
Line 14, should read -- define a closed electrical circuit between said outside --

Signed and Sealed this

Twenty-sixth Day of February, 2002

Attest:

Attesting Officer

JAMES E. ROGAN
Director of the United States Patent and Trademark Office